United States Patent [19]

Fairbanks

[11] Patent Number: 4,513,410
[45] Date of Patent: Apr. 23, 1985

[54] PICKUP CARTRIDGE HAVING STYLUS HOLDER

[75] Inventor: David W. Fairbanks, Monmouth Junction, N.J.

[73] Assignee: RCA Corporation, Princeton, N.J.

[21] Appl. No.: 476,908

[22] Filed: Mar. 18, 1983

[51] Int. Cl.³ .............................................. G11B 3/44
[52] U.S. Cl. .................................. 369/126; 369/170; 369/173
[58] Field of Search ....................... 369/126, 173, 170

[56] References Cited

U.S. PATENT DOCUMENTS 4,404,670 9/1983 Taylor ............................ 369/126 X
4,441,176 4/1984 Newell ................................ 369/170

Primary Examiner—Robert L. Richardson
Attorney, Agent, or Firm—Paul J. Rasmussen; William H. Meise; Dilip A. Kulkarni

[57] ABSTRACT

A pickup stylus is secured to a plastic stylus holder at one end thereof by inserting it into the holder in a direction that bears a desired, non-perpendicular angle in respect of the longitudinal axis of the stylus holder. The one end of the stylus holder is provided with a surface which is disposed at right angles to the direction of stylus insertion into the holder in order to reduce the possibility of stylus misalignment and mislocation. The stylus holder has a cutout which is shaped and dimensioned such that the resonance frequency of the stylus holder is located near the upper end of the audible frequency range. The stylus holder, which has these and other features, is not only simple and inexpensive, but also has the desired performance characteristics.

12 Claims, 7 Drawing Figures

PICKUP CARTRIDGE HAVING STYLUS HOLDER

The present invention relates generally to a video disc record player and, more particularly, to a pickup stylus cartridge for use therewith.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In video disc systems, the information track density is generally quite high. For example, the above-mentioned capacitance-type system uses a spirally-grooved information track with a groove density of nearly 10,000 grooves per inch (groove width=approximately 2.5 micrometers). During playback, the stylus tip is received in the groove and guided toward the record center as a turntable-supported record revolves at the desired speed. The microscopic groove geometries require a stylus that has rather fine dimensions (e.g., tip width-2 micrometers).

The pickup stylus is typically housed in a protective cartridge. The stylus is disposed at one end of a stylus holder attached to the free end of a stylus arm. The other end of the stylus arm is suspended in a cartridge housing by a rubber suspension. The stylus arm is held inside the cartridge housing in its stored position by a pair of retaining fingers. A leaf spring (or a flylead) has one end secured to the stylus, and its other end to the cartridge housing. The flylead provides the stylus/record engagement force, and also serves as the electrical connection between the stylus and the signal processing circuits of a video disc player.

The stylus cartridge is inserted into a carriage translatably mounted in the video disc player. When the cartridge is thus installed in the carriage, the stylus arm retaining fingers are automatically spread apart to release the stylus arm. The stylus arm rests on a stylus arm support bracket when freed from the cartridge retaining fingers as will become clear later. The bottom wall of the carriage has an opening through which the stylus is selectively lowered onto a turntable-supported record for playback. The carriage is driven to cause it to follow the radially inward motion of the groove-guided stylus.

Disposed in the carriage are a number of stylus arm control mechanisms. The stylus arm lifting/lowering mechanism serves to lower the stylus onto the disc for playback, and then raise it back up into the cartridge for storage. (Refer to U.S. patent application Ser. No. 449,314, of Brauer.) A groove skipper mechanism, housed in the carriage, comprises a permanent magnet mounted on the stylus arm at right angles to it, and an electromagnet located in the carriage near the skipper magnet. The groove skipper mechanism, when activated, serves to displace the stylus laterally of the record, for example, in order to cause the stylus to skip ahead or back. (See U.S. Pat. No. 4,258,233 issued to Simshauser.) Further mounted in the carriage is an armstretcher mechanism including a further permanent magnet disposed axially inside the stylus arm tube, and an electromagnet located in the carriage adjacent to it. When signals are applied to the armstretcher electromagnet, it produces magnetic fields which interact with the stylus arm-mounted, axial magnet to cause front-to-back motion of the stylus arm in a manner opposing the cyclical errors in the stylus/record relative velocity during playback. (Refer to U.S. patent application, Ser. No. 366,644, now U.S. Pat. No. 4,481,614, of Taylor et al.)

In order to facilitate these and other features of a video disc player, the stylus arm should be relatively stiff. Even though the stylus arm may be rigid, the stylus should be secured to the stylus arm in a manner affording a degree of vertical decoupling. When the stylus tracks over imperfections in the groove (e.g., microdefects or dust particles), it experiences vertical oscillations which introduce timebase distortions into the recovered signal. It has been found advantageous to mount the stylus in a compliant holder (e.g., plastic), which, in turn, is fixed to a relatively stiff stylus arm (e.g., aluminum tube). The resilient holder has a flat, elongated section colinear with the longitudinal axis of the stylus arm to which the stylus is attached. The resilient flat section of the stylus holder yields vertically to permit the stylus to ride over the bumps on the disc independent of the stylus arm itself. For an example of a pickup cartridge of this type reference may be made to U.S. patent application, Ser. No. 413,424 (McNeely).

It is desirable to mount the pickup stylus at an angle to the longitudinal axis of the stylus arm (e.g., 67.5°), so that when the pickup stylus is lowered onto the disc for playback it bears the desired orientation with respect to the disc surface (e.g., perpendicular). The stylus is typically secured to a plastic stylus holder at one end thereof by piercing it into the holder along a direction that is disposed at an angle to the stylus arm axis. The angular insertion of the pickup stylus into a flat stylus holder produces problems—such as stylus misalignment, stylus mislocation, etc., during the assembly of the stylus to the holder.

Another problem with a conventional flat holder is that the stylus flylead lays flat against the holder, particularly, when the stylus arm is held back in the cartridge in its stored position. Because of the flatness of the flylead and the stylus holder, the flylead has a tendency to adhere to the holder, and in some cases, prevent the stylus from being lowered onto the disc for playback.

As indicated above, the stylus holder experiences mechanical vibrations during information recovery. The mechanical oscillations occuring at frequencies in the audible frequency range (i.e., 20 Hertz to 20 Kilohertz) and near the resonance frequency of the stylus holder are amplified, thereby deleteriously affecting the quality of the information recovered from the disc, for example, in introduction of audible hum in the output of the player audio circuits. It is, therefore, desirable to locate the resonance frequency of the stylus holder toward or beyond the upper end of the audible frequency range, or to reduce the amplitude of the resonance peak of the stylus holder, or both.

In accordance with this invention, the stylus holder is provided with a surface at one end thereof which is disposed substantially at right angles to the direction of stylus insertion into the holder to facilitate stylus/holder assembly.

According to a further feature of the invention, the stylus holder is provided with a raised portion which engages the flylead to guide it away from the body of the holder at a certain angle to prevent stylus sticking.

Pursuant to a still further aspect of the invention, the stylus holder is provided with a cutout which is shaped and configured such that the resonance frequency of the holder falls near the upper end of the audible frequency range.

An additional feature of the invention is that the angular stylus insertion surface, the flylead bump and the resonance cutout are all disposed on the same side of the holder to facilitate fabrication thereof.

In the Drawings

Figure 5:
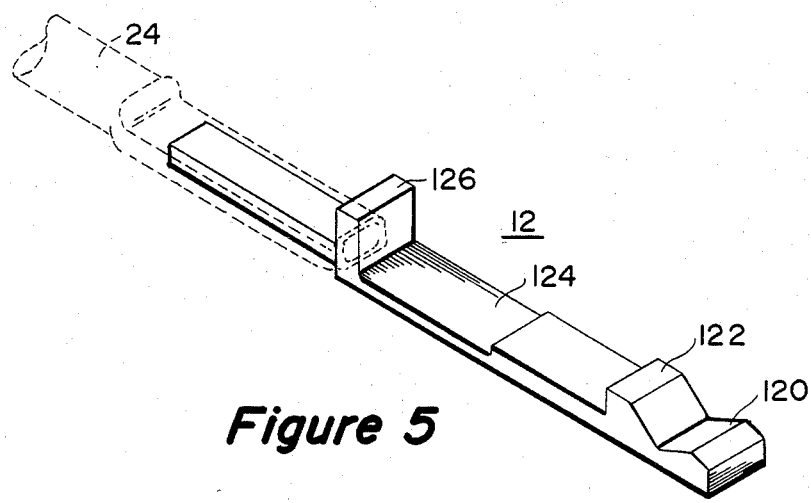

FIG. 5 portrays a perspective view of the subject stylus holder; and

Figure 6:
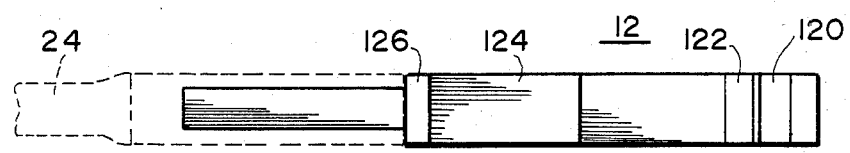
Figure 7:
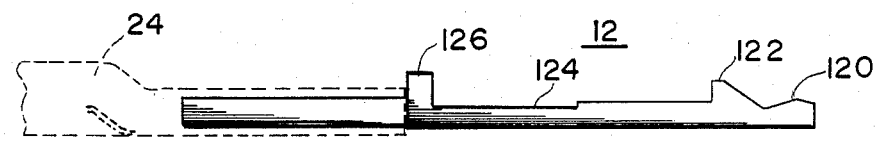

FIGS. 6 and 7, respectively, show a plan view and a side view of the instant stylus holder.

Figure 1:
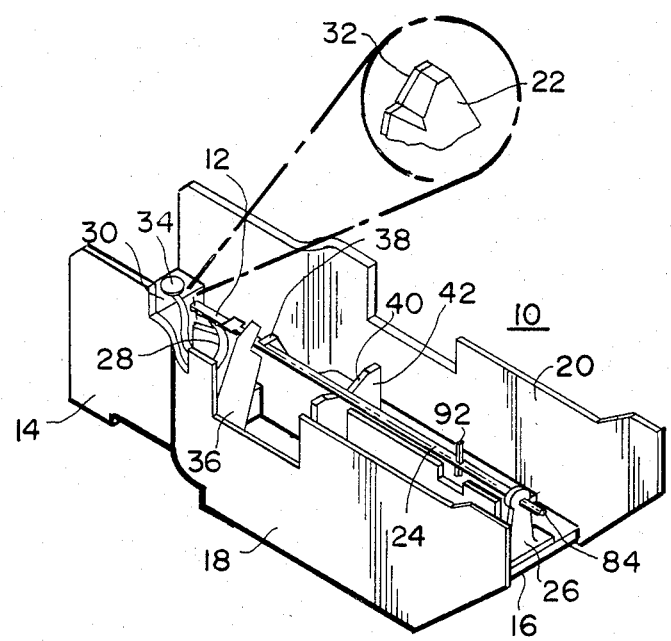
FIG. 1 is a pickup cartridge, shown upside down, incorporating a stylus holder in accordance with this invention.

Shown in FIG. 1 is a pickup cartridge 10 embodying a plastic stylus holder 12 (e.g., polypropylene) of the present invention. The cartridge has a molded plastic housing 14 (e.g., polystyrene) comprising a top wall 16 interconnecting a pair of spaced side walls 18 and 20. A pickup stylus 22 is disposed at one end of the stylus holder 12 at an angle (e.g., 67.5°) such that when the stylus is lowered onto a turntable-mounted disc for playback the stylus bears an appropriate orientation toward the disc surface (e.g., 85°). The pickup stylus 22 consists of a diamond tip disposed at the end of a titanium shank. The stylus tip dimensions are: height—3 micrometers, width—2 micrometers, and depth—5 micrometers. The titanium stylus shank is about 0.070 inches long, and 0.012 inches in diameter. To secure the stylus 22 to the stylus holder 12, the stylus is simply pierced into the plastic holder at the desired angle. The features of the subject stylus holder 12 will be described in detail later.

The stylus holder 12 is rigidly secured to a tubular, light-weight stylus arm 24 by inserting the other end of the holder into the hollow stylus arm, and then crimping the end of the stylus arm over the holder. The stylus arm 24 comprises a relatively stiff aluminum tube about 1.654 inches long, having an inside diameter of 0.040 inches and a wall thickness of 0.002 inches. The back end of the stylus arm 24 is suspended from the top wall 16 by a rubber suspension 26. The rear suspension 26 of the stylus arm 24 comprises a flat piece of rubber about 0.375 inches long, 0.125 inches wide and 0.015 inches thick.

A planar, ribbon-like flylead 28, deformed into a compressive arc, is connected between the stylus 22, and a shelf portion 30, integrally molded with the cartridge casing 14. The flylead 28 provides an electrical connection between a stylus-mounted electrode 32, approximately 0.2 micrometers deep, and the player pickup circuits housed in the carriage 50, shown in FIG. 2, when the cartridge is installed in the carriage. The flylead 28 additionally serves to provide stylus/record engagement force during play. The flylead 28 comprises a flat leaf spring made from copper, about 1.125 inches long, 0.025 inches wide and 0.000560 inches thick. One end of the leaf spring 28 is glued to the stylus 22 by a suitable epoxy. The other end of the flylead 28 is attached to the cartridge shelf 30 by a metallic rivet 34. The length of the flylead 28 is such that it tends to expel the stylus 22 from the cartridge 10 when the stylus arm is in the stored position, and such that it provides appropriate stylus/record tracking pressure (e.g., 60 to 70 milligrams) when the stylus is lowered onto the disc for playback.

The cartridge 10 is fitted with a pair of flat retaining fingers 36 and 38 to hold the stylus arm 24 against a V-shaped groove 40 disposed in a downwardly depending wall 42 integrally molded with the cartridge case 14.

Figure 2:
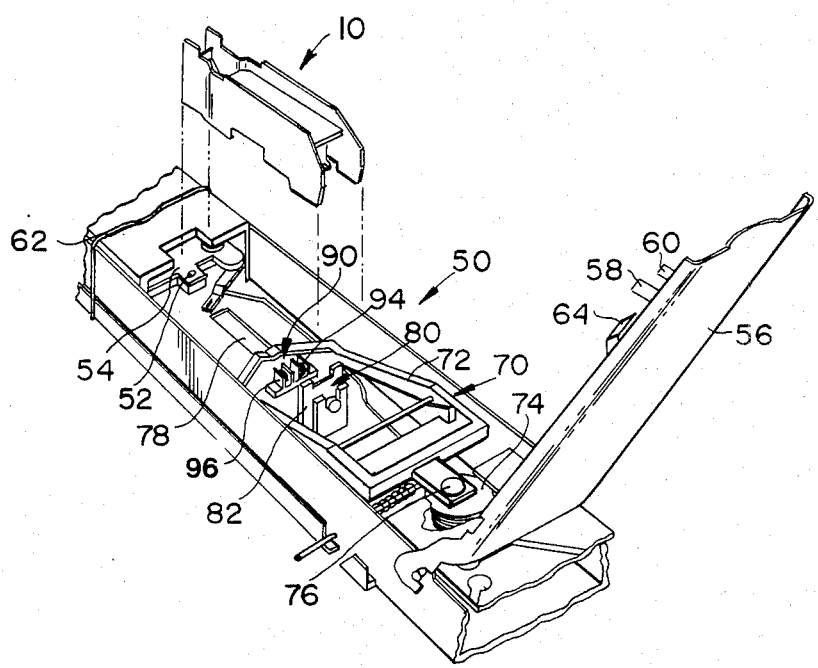
FIG. 2 is shows a translatable carriage into which the pickup cartridge of FIG. 1 is inserted.

The cartridge 10 is installed in a carriage 50 shown in FIG. 2. Upon installation, the cartridge terminal 34 contacts a terminal 52 of pickup circuits 54. When the carriage lid 56 is closed, a pair of depending tabs 58 and 60 disposed thereon defeat the cartridge retaining fingers 36 and 38 to release the stylus arm 24. The carriage 50 is fitted with a wire hoop 62 to lock the lid 56 shut. A leaf spring 64, attached to the underside of the lid 56, firmly seats the cartridge 10 in the carriage 50 upon closure.

Housed in the carriage 50 is a stylus lifter mechanism 70 comprising a pivotally-mounted, stylus arm support bracket 72, and an electromagnet 74. The stylus arm 24 rests on the lifter support bracket 72 as the cartridge retaining fingers 36 and 38 are spread apart upon insertion of the cartridge 10 in the carriage 50. When the lifter electromagnet 74 is actuated, a permanent magnet 76 attached to the lifter bracket 72 is repelled to cause the bracket to gently lower the stylus 22 through an opening 78 in the carriage 50 onto a turntable-mounted record. The abovesaid U.S. patent application of Brauer describes a suitable stylus lifter mechanism of this type.

An armstretcher mechanism 80, which is located in the carriage 50, comprises an electromagnet 82 and an axial magnet 84 mounted inside the stylus arm tube 24. The armstretcher electromagnet 82 creates forces on the axial magnet 84 to cause to-and-fro excursions of the stylus 22 in a manner offsetting cyclical errors in the stylus/record relative velocity during playback. A more detailed description of the armstretcher mechanism can be found in the aforesaid U.S. patent application of Taylor et al.

Further mounted in the carriage 50 is a stylus skipper mechanism 90 including a stylus arm-mounted, perpendicular magnet 92, and a pair of Helmholtz air coils 94 and 96. When energized, the air coils 94 and 96 displace the stylus 22 across the record, for example, for rapid visual search. U.S. Pat. No. 4,258,233 gives specifics of the stylus skipper mechanism.

Figure 3:
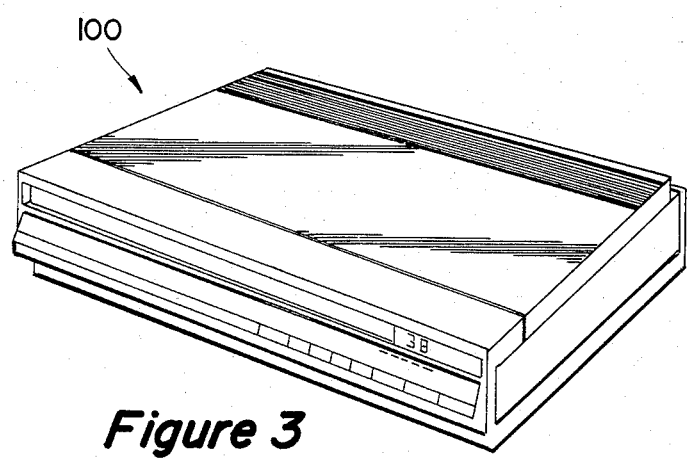
FIG. 3 illustrates a video disc player into which the FIG. 2 carriage is translatably mounted.

The pickup carriage 50 is translatably mounted in the video disc player 100 shown in FIG. 3. To initiate playback, the stylus lifter 70 is actuated to lower the stylus 22 onto a video disc 102 disposed on a rotatable turntable 104 in the manner depicted in FIG. 4. During playback, the turntable 104 is rotated at the desired speed (e.g., 450 rpm) and the carriage 50 is translated toward the record center to recover the prerecorded signals from the disc 102.

The vertical spacing between the carriage 50 and a turntable-mounted disc is such that, when the stylus 22 is riding on the disc, the axis of the stylus is disposed substantially perpendicularly with respect to the disc surface. To this end, the stylus 22 is attached to the stylus holder such that the stylus axis bears the desired angle (e.g., 67.5°) with respect to the axis of the stylus arm.

The feature of the subject stylus holder 12 will be described in conjunction with FIGS. 5-7. The stylus holder 12 is made from polypropylene material, which is doped with carbon black (e.g., 4 percent) to give it the desired dynamic characteristics—such as compliance, resonance properties, etc. The stylus holder 12 is provided with a surface 120 at its stylus end such that the surface is arranged substantially perpendicularly with respect to the direction of stylus insertion into the holder. As previously indicated, the stylus 22 is secured to the plastic stylus holder 12 by piercing the stylus into the holder. Provision of a surface at right angles to the stylus insertion direction reduces the possibility of slippage between the stylus tip and the holder during insertion, thereby, in turn, reducing the possibility of stylus misalignment and mislocation.

Figure 4:
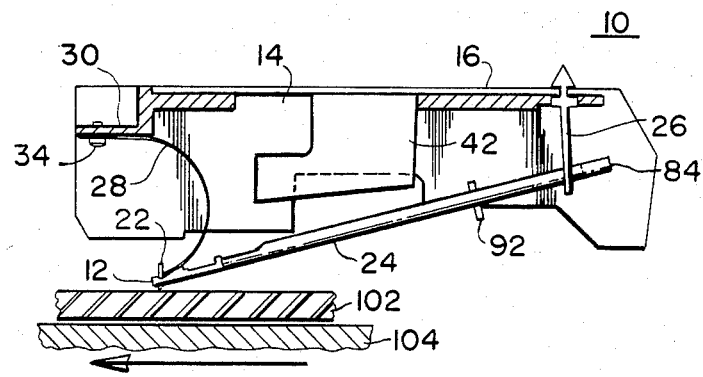
FIG. 4 depicts a cross-sectional view of the FIG. 1 pickup cartridge illustrated in an operating relationship with a video disc.

According to a further feature of the invention, the stylus holder 12 is provided with a raised portion 122 to guide the stylus flylead 28 away from the holder at the desired angle as shown in FIG. 4. This feature of the stylus holder 12 reduces the possibility of the flylead 28 sticking to the holder when the stylus arm 24 is raised inside the cartridge 10, whereby the stylus 22 is prevented from being lowered onto the disc. This aspect of the invention also assures that the stylus flylead 28 breaks away from the stylus holder 12 at the desired angle in the manner shown in FIG. 4 to, in turn, assure the desired stylus/record tracking pressure (e.g., 60 to 70 milligrams).

Pursuant to a further feature of the invention, the stylus holder 12 is provided with a cutout 124 which is dimensioned and shaped such that the resonance frequency of the stylus holder is located toward the upper end of the audible frequency range (e.g., 20 Hertz to 20 Kilohertz). This aspect of the invention reduces the possibility of the occurrence of the audible hum in the output of the player audio circuits.

An additional feature of the subject stylus holder 12 is that it is provided with a shoulder portion 126 at its stylus arm end that accurately and consistently positions the holder into the stylus arm tube at the proper depth.

In accordance with still another aspect of the invention, the stylus insertion surface 120, the flylead raised portion 122, the resonance cutout 124, and the shoulder portion 126 are all located on the same side of the stylus holder to facilitate the fabrication of the holder (e.g., molding, milling, etc.).

The stylus holder 12 may be provided with a press fit hole at its stylus end to facilitate the insertion of the diamond stylus 22 into the holder. The stylus hole is dimensioned to obtain an interference fit between the stylus 22 and the holder 12.

The stylus holder 12 of this invention is not only simple and inexpensive, but it also has the desired dynamic characteristics.

What is claimed is:

1. An elongated stylus holder for use with a flylead; said stylus holder having a stylus secured to one end thereof by inserting said stylus into said holder one end along a direction which is disposed at a non-perpendicular angle to the longitudinal axis of said holder; said one end of said holder being provided with a surface which is arranged substantially at right angles to said stylus insertion direction to facilitate said stylus insertion; said flylead having an end thereof attached to said holder-mounted stylus; said stylus holder having a raised portion adjacent to said one end of said stylus holder to guide said flylead away from said holder at a given angle when said flylead is secured to said stylus; said raised portion and said surface through which said stylus is inserted being disposed on the same side of said stylus holder; said stylus holder being dimensioned and shaped such that the resonance frequency of said stylus holder is disposed toward the upper end of the audible frequency range; wherein the disposition of the resonance frequency of said holder toward the upper end of the audible frequency range is achieved by providing a cutout in said holder on the same side thereof as said raised portion and said stylus insertion surface of said holder.

2. The stylus holder as formed in claim 1 for use with a tubular stylus arm secured thereto at its other end; wherein said tubular stylus arm is secured to said other end of said holder by inserting an end of said stylus arm over said holder other end until said stylus arm end abuts a shoulder portion disposed on said holder, and then crimping said stylus arm end over said holder other end.

3. The stylus holder as set forth in claim 2 wherein said shoulder portion is arranged on the same side of said holder as said stylus insertion surface, said raised portion and said cutout in said holder.

4. The stylus holder as described in claim 3 wherein said stylus holder is provided with a hole at said one end in said stylus insertion direction into which said stylus is inserted; said hole being smaller than the cross-section of said stylus to obtain an interference fit between said stylus and said holder.

5. The stylus holder as defined in claim 4 being made from polypropylene material.

6. The stylus holder as set forth in claim 5 wherein said polypropylene material is doped with carbon black.

7. In a pickup cartridge comprising a protective housing; an elongated stylus arm having one end suspended in said cartridge housing; a stylus holder being secured to the free end of said stylus arm; a stylus being secured to said holder at one end thereof by inserting it into said one end such that the axis of said stylus subtends a non-perpendicular angle with respect to the axis of said stylus arm; said one end of said holder being provided with a surface which is disposed substantially at right angles to said stylus insertion direction to facilitate said stylus insertion; a flylead having one end attached to said stylus and the other end secured to said cartridge housing; means for retaining said stylus arm within said cartridge housing during storage; stylus holder having a raised portion adjacent to said one end thereof to make sure that said flylead breaks away from said holder at a given angle; stylus holder being provided with said raised portion and said surface on the same side thereof; said stylus holder being dimensioned and shaped such that the resonance frequency of said stylus holder is disposed toward the upper end of the audible frequency range; wherein the disposition of the resonance frequency of said holder toward the upper end of the audible frequency range is achieved by providing a cutout in said holder on the same side thereof as said raised portion and said stylus insertion surface of said holder.

8. The pickup cartridge as formed in claim 7 wherein said stylus arm is tubular; wherein said tubular stylus arm is secured to the other end of said holder by inserting an end of said stylus arm over said holder other end until said stylus arm end abuts a shoulder portion disposed in said holder, and then crimping said stylus arm end over said holder other end.

9. The pickup cartridge as set forth in claim 8 wherein said stylus holder is provided with said shoulder portion on the same side as said stylus insertion surface, said raised portion, and said cutout in said holder.

10. The pickup cartridge as described in claim 9 wherein said stylus holder is provided with a hole at said one end in said stylus insertion direction into which said stylus is inserted; said hole being smaller than the cross-section of said stylus to obtain an interference fit between said stylus and said holder.

11. The pickup cartridge as set forth in claim 10 wherein said stylus holder is made from polypropylene material.

12. The pickup cartridge as defined in claim 11 wherein said stylus holder is made from polypropylene material doped with carbon black.

* * * * *